Nov. 6, 1956
G. E. KIDDE
2,769,689
PROCESS FOR TREATMENT OF WASTE PICKLE LIQUOR
Filed March 14, 1955
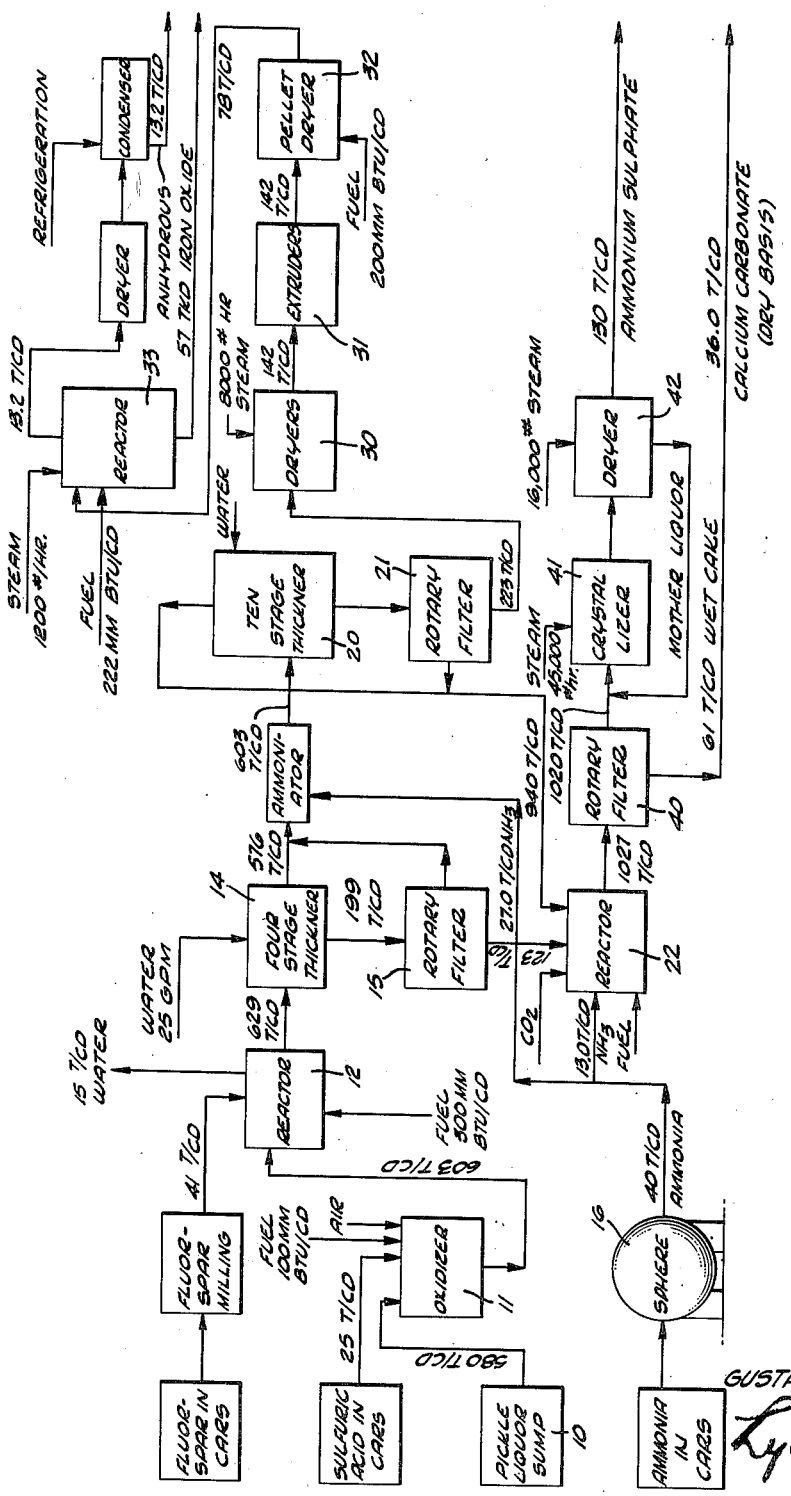
INVENTOR.
GUSTAVE E. KIDDE
ATTORNEYS

United States Patent Office 2,769,689
Patented Nov. 6, 1956

2,769,689

PROCESS FOR TREATMENT OF WASTE PICKLE LIQUOR

Gustave E. Kidde, Pasadena, Calif., assignor to Kidde Process Corporation, South Pasadena, Calif., a corporation of California Application March 14, 1955, Serial No. 494,015

7 Claims. (Cl. 23—153)

This invention relates to the treatment of waste pickle liquor and has particular reference to a process for the production of valuable chemical products from waste pickle liquor.

Large annual tonnages of pickle liquor are used in steel processing operations, and disposal of the waste pickle liquor, consisting primarily of ferrous sulfate, sulfuric acid and water, has developed into a serious problem for the industry. Additionally, at the present time, the depleted pickle liquor is considered to be useless and the chemical values therein are completely lost. Accordingly, one of the principal objects of this invention is to provide a process for the conversion of waste pickle liquor into valuable products.

Another object of this invention is to provide a process for the production of hydrogen fluoride, hydrofluoric acids, ammonium sulfate, ferric oxide, and other valuable chemicals from waste pickle liquor.

Other objects and advantages of this invention it is believed will be readily apparent from the following detailed description of a preferred embodiment thereof when read in connection with the accompanying drawings.

In the drawings:

The single figure is a flow sheet illustrating a preferred process embodying this invention.

In carrying out the process of this invention, the waste pickle liquor, which consists primarily of ferrous sulfate, sulfuric acid and water, is first oxidized to the ferric state, such as by the addition of sufficient sulfuric acid and air to convert all of the ferrous ion to the ferric. In actual practice, this is accomplished by adding acid and then blowing the heated mass with air until the conversion has taken place.

The oxidized liquor is then reacted with finely ground fluorspar (calcium fluoride), at a temperature in the range of 175–225° F., resulting in the formation of a soluble complex sulfate containing iron combined with fluorine. The reaction includes the conversion of the calcium in the fluorspar to a calcium sulfate precipitate which is separated from the solution as by filtration. The solution, consisting of the soluble complex compound and soluble ferric sulfate, is neutralized with ammonia to form an insoluble complex hydroxide containing iron and fluorine (ferric fluohydroxide), insoluble ferric hydroxide and soluble ammonium sulfate.

The insoluble hydroxides are separated from the solution, dried and converted to ferric oxide and hydrogen fluoride by treating with air and steam at elevated temperatures in the range of 700–1200° C., the fluorine complex thus being broken down into hydrogen fluoride and ferric oxide, and the ferric hydroxide merely being dewatered to the ferric oxide. In this operation the hydrogen fluoride is evolved as a gas and is cooled, dried and condensed as the anhydrous compound, or may be absorbed in water to produce hydrofluoric acids. The oxides are cooled and returned to the steel mill where they are added to the blast furnace charges, or the ferric oxide may be sold as such. If desired, magnetite rather than iron oxide may be produced by eliminating the air from the reaction at the elevated temperature.

The ammonium sulfate solution referred to above is crystallized to produce ammonium sulfate, which is dried and marketed as such. Additional ammonium sulfate may be obtained by reacting the calcium sulfate, referred to above, with ammonia and carbon dioxide, producing ammonium sulfate in solution and a precipitate of calcium carbonate.

Referring now to the drawing, the single figure illustrates the process of this invention and represents a specific example thereof as applied to a continuously-operated commercial plant designed for the daily production of 13.2 tons of anhydrous hydrogen fluoride, 57 tons of iron oxide, 130 tons of ammonium sulfate and 36 tons of calcium carbonate. No attempt has been made in the drawing to illustrate any specific details of the apparatus, as each piece of apparatus is well known in the art and may be obtained and readily operated by any person skilled in the art after having read this specification.

As indicated in the drawing, the available pickle liquors, in this case consisting of an aqueous solution of 18.8% ferrous sulfate and 2.0% sulfuric acid, are collected in a sump 10 where entrained solids are allowed to settle out. The clear effluent is then pumped to one of two oxidizers 11, at the rate of 580 tons per day, where it is mixed with sulfuric acid (25 tons per day) and then blown with hot air and steam until all ferrous irons have been converted to the ferric state. The reaction time is about two hours and the temperature is about 200° F. The oxidized liquor is then pumped to the agitated reactor 12.

The fluorspar is dried and ground using a primary crusher and a ball mill, and 41 tons per day of the ground material are fed to the reactor 12. Metered quantities of the oxidized liquor are therein reacted, at a temperature of about 200° F., with weighed amounts of the fluorspar in the approximate ratio of 15 parts liquor to one part fluorspar, heat being introduced in the form of steam. The reaction time is about three hours for the completed cycle, the end product being a soluble complex of iron fluorine and sulfate, a soluble ferric sulfate and a precipitate of calcium sulfate.

These reaction products (629 tons per day) are washed counter-currently in four forty-foot diameter thickeners 14, the thickener underflow (calcium sulfate) being dewatered by filtration on a string discharge filter 15 of about 200 square feet in size and fed to the reactor 22 for the ammonium sulfate production described below.

The thickener overflow is combined with the filtrate from the filter 15 and the combined stream (576 tons per day) is reacted with gaseous ammonia (27 tons per day) from the storage sphere 16. The soluble compounds are thus converted into insoluble ferric fluohydroxide, insoluble ferric hydroxide and soluble ammonium sulfate. The reaction products (603 tons per day) are water-washed in two multi-stage tray thickeners 20 and the underflow therefrom is dewatered on two 260 square foot string discharge filters 21. The filtrate and the thickener overflow (ammonium sulfate solution) are mixed and fed to the reactor 22 for conversion to solid ammonium sulfate as is described more fully below.

The filter cake (223 tons per day) from the filters 21 is mixed and partially dried in two steam driers 30 and then extruded through two auger type extruders 31 to produce ⅛ inch diameter pellets. These are dried to less than about 3% moisture content in a drier 32.

The pellets (78 tons per day) are thermally decomposed in a reactor 33 where the addition of heat (about 1000° C.) is sufficient to break down the fluorine complex into hydrogen fluoride gas (13.2 tons per day) and iron oxide (57 tons per day). Upon cooling, the iron oxide is suitable for use in the blast furnaces or for sale for other uses.

The hydrogen fluoride is cooled, dried and condensed, the liquid product (13.2 tons per day) being stored in refrigerated tanks from which it is shipped in bulk or in pressure cylinders.

The calcium sulfate is converted into marketable ammonium sulfate by reaction with ammonia and carbon dioxide in the reactor 22. The calcium sulfate is thus converted to soluble ammonium sulfate and insoluble calcium carbonate. The mixture (1027 tons per day) is filtered in the filter 40 to produce 61 tons per day of wet calcium carbonate cake. The high purity calcium carbonate can be used in the blast furnaces, converted to lime in a kiln or used in other industrial chemical operations.

The filtrate, consisting of ammonium sulfate solution is crystallized in a crystallizer 41 and then dried in a centrifuge-drier 42. The dried crystals are stored in a 10,000 ton shed prior to shipment.

Having fully described my invention, it is to be understood that I do not wish to be limited to the details herein set forth, but my invention is of the full scope of the appended claims.

I claim:

1. In a process for the production of valuable products from waste pickle liquor containing ferrous sulfate, the steps comprising oxidizing said ferrous sulfate to form ferric sulfate, reacting the ferric sulfate thus produced with fluorspar to form a mixture of a soluble complex of iron, fluorine and sulfate, and a precipitate of calcium sulfate, separating the calcium sulfate from the mixture, neutralizing said calcium sulfate-free mixture to produce a mixture of an insoluble ferric fluohydroxide, insoluble ferric hydroxide and a solution of a sulfate compound, separating said ferric compounds from said mixture, and subjecting said ferric compounds to a temperature in excess of about 700° C. to produce hydrogen fluoride gas and iron oxide.

2. In a process for the production of valuable products from waste pickle liquor containing ferrous sulfate, the steps comprising oxidizing said ferrous sulfate to form ferric sulfate, reacting the ferric sulfate thus produced with fluorspar to form a mixture of a soluble complex of iron, fluorine and sulfate, and a precipitate of calcium sulfate, separating the calcium sulfate from the mixture, neutralizing said calcium sulfate-free mixture with ammonia to produce a mixture of insoluble ferric fluohydroxide, insoluble ferric hydroxide and a solution of ammonium sulfate, separating said ferric compounds from said mixture, and subjecting said ferric compounds to an elevated temperature in excess of about 700° C. to produce hydrogen fluoride gas and iron oxide.

3. In a process for the production of valuable products from waste pickle liquor containing ferrous sulfate, the steps comprising oxidizing said ferrous sulfate to form ferric sulfate, reacting the ferric sulfate thus produced with fluorspar to form a mixture of a soluble complex of iron, fluorine and sulfate, and a precipitate of calcium sulfate, separating the calcium sulfate from the mixture, neutralizing said calcium sulfate-free mixture with ammonia to produce a mixture of insoluble ferric fluohydroxide, insoluble ferric hydroxide and a solution of ammonium sulfate, separating said ferric compounds from said mixture, drying said ferric compounds, and heating said compounds to a temperature in the range of 700° C. to 1200° C. to produce hydrogen fluoride gas and iron oxide.

4. In a process for the production of valuable products from waste pickle liquor containing ferrous sulfate, the steps comprising oxidizing said ferrous sulfate to ferric sulfate by adding sulfuric acid to said pickle liquor and blowing heated air therethrough, reacting the ferric sulfate thus produced with fluorspar to form a mixture of a soluble complex of iron, fluorine and sulfate, and a precipitate of calcium sulfate, separating the calcium sulfate from the mixture, neutralizing said calcium sulfate-free mixture to produce a mixture of an insoluble ferric fluohydroxide, insoluble ferric hydroxide and a solution of a sulfate compound, separating said ferric compounds from said mixture, and subjecting said ferric compounds to a temperature in excess of about 700° C. to produce hydrogen fluoride gas and iron oxide.

5. In a process for the production of valuable products from waste pickle liquor containing ferrous sulfate, the steps comprising oxidizing said ferrous sulfate to ferric sulfate by adding sulfuric acid to said pickle liquor and blowing heated air therethrough, reacting the ferric sulfate thus produced with fluorspar to form a mixture of a soluble complex of iron, fluorine and sulfate, and a precipitate of calcium sulfate, separating the calcium sulfate from the mixture, neutralizing said calcium-free mixture of insoluble ferric fluohydroxide, insoluble ferric hydroxide and a solution of ammonium sulfate, separating said ferric compounds from said mixture, drying said ferric compounds, and heating said compounds to a temperature in the range of 700°C. to 1200°C. to produce hydrogen fluoride gas and iron oxide.

6. In a process for the production of valuable products from waste pickle liquor containing ferrous sulfate, the steps comprising oxidizing said ferrous sulfate to form ferric sulfate, reacting the ferric sulfate thus provided with fluorspar to form a mixture of a soluble complex of iron, fluorine and sulfate, and a precipitate of calcium sulfate, separating the calcium sulfate from the mixture, neutralizing said calcium sulfate-free mixture to produce a mixture of an insoluble ferric fluohydroxide, insoluble ferric hydroxide and a solution of a sulfate compond, separating said ferric compounds from said mixture, and subjecting said ferric compounds to a temperature in the range of 700°C. to 1200°C. to produce hydrogen fluoride gas and iron oxide.

7. In a process for the production of valuable products from waste pickle liquor containing ferrous sulfate, the steps comprising oxidizing said ferrous sulfate to form ferric sulfate by adding sulfuric acid to said pickle liquor and blowing heated air therethrough, reacting the ferric sulfate thus produced with fluorspar to form a mixture of a soluble complex of iron, fluorine and sulfate, and a precipitate of calcium sulfate, separating the calcium sulfate from the mixture, neutralizing said calcium sulfate-free mixture to produce a mixture of an insoluble ferric fluohydroxide, insoluble ferric hydroxide and a solution of a sulfate compound, separating said ferric compounds from said mixture, and subjecting said ferric compounds to a temperature in the range of 700° C. to 1200° C. to produce hydrogen fluoride gas and iron oxide.

References Cited in the file of this patent

UNITED STATES PATENTS 2,184,419    Fowler et al. _____ Dec. 26, 1939

OTHER REFERENCES

Hodge's "Waste Problems of the Iron and Steel Industries," articles in Ind. and Eng. Chem., vol. 31, No. 11, page 1370.

J. W. Mellor's "Inorganic and Theoretical Chem.," vol. 14, 1935 ed., page 317. Longmans, Green and Co., New York.